March 17, 1959 L. J. McDONALD 2,878,355
ELECTRIC TEMPERATURE SENSING ELEMENT
Filed Jan. 29, 1958
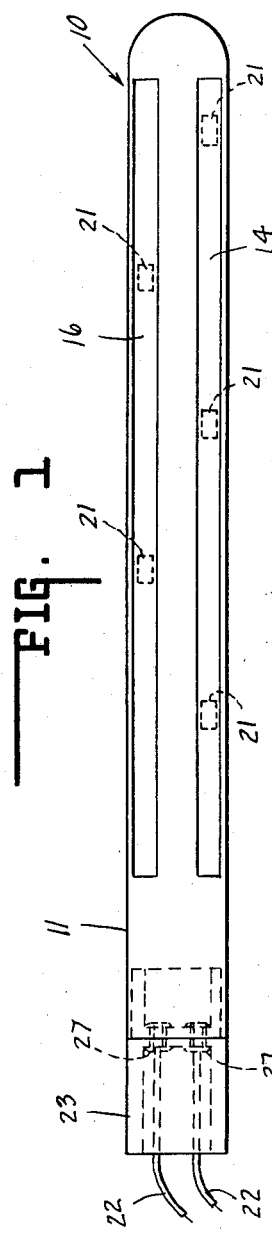
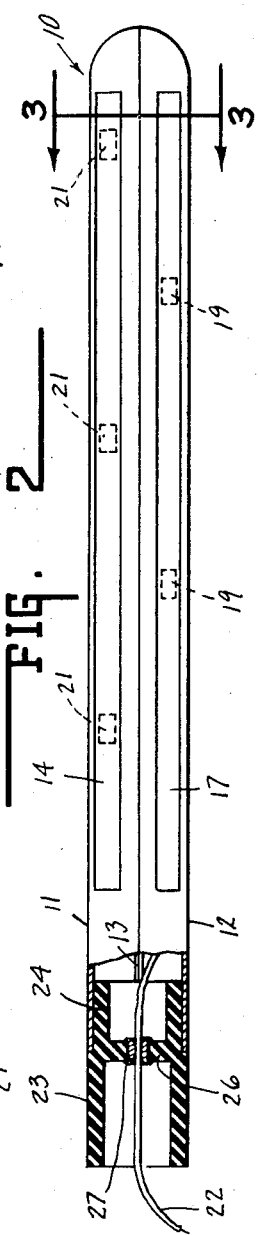
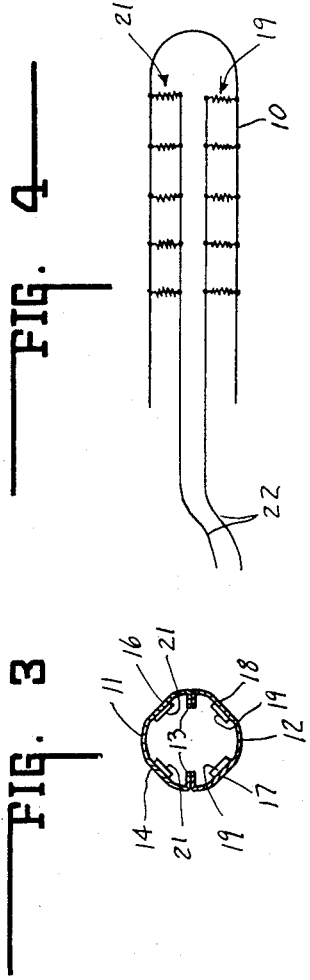
INVENTOR.
LYELL J. McDONALD.
BY
Lockwood, Galt, Wooday & Smith
ATTORNEYS.

United States Patent Office 2,878,355
Patented Mar. 17, 1959

2,878,355

ELECTRICAL TEMPERATURE SENSING ELEMENT

Lyell J. McDonald, Elkhart, Ind., assignor to Penn Controls, Inc., Goshen, Ind., a corporation Application January 29, 1958, Serial No. 711,856

4 Claims. (Cl. 201—63)

This invention relates generally to temperature sensing elements, and is particularly related to a temperature sensing element which accommodates temperature responsive electrical resistances in a hermetically sealed casing.

In providing temperature sensing elements for actuating the control circuits of heating or cooling means, it has become conventional to utilize electrical resistances having a high thermal coefficient of resistance. A popular type of electrical resistance used for this purpose are negative coefficient resistances referred to as thermistors. One type of control circuit which utilizes temperature responsive resistances as a sensing element is that disclosed in my copending application entitled "Magnetic Amplifier Circuit," Serial No. 585,728, filed May 18, 1956.

The thermistor type resistances referred to in the description of the present invention are conventionally formed in a flat configuration. The negative temperature coefficient material is conventionally coated on its two opposed major surfaces with a thin layer of silver. The silver coating on each surface thus acts as a connecting terminal for the thermistor and may have lead wires or similar conductors soldered thereto. In the application of such thermistors, any accumulation of moisture on the conductive coating of the thermistor elements tends to rapidly destroy the coating, the electrical resistance of the thermistor generally increasing with deterioration of the coating. A satisfactory sensing element assembly thus requires that the thermistors or sensing resistances be hermetically sealed against moisture or other corrosive atmospheres. This requirement, however, is opposed by the necessity of making the sensing element respond rapidly to changes in the temperature of the air or other medium surrounding it.

An object of the present invention, therefore, is to provide a temperature sensing element in which the temperature responsive resistances are hermetically sealed and which is characterized by a rapid response to temperature changes of the surrounding medium.

A further object of the present invention is to provide a temperature sensing element which accommodates in staggered, spaced relation banks of temperature responsive resistances with the casing acting as a common connector for one terminal each of the resistances.

A further object of the present invention is to provide a temperature sensing element which includes a tubular casing having axially-extending, circumferentially spaced flats thereon, the inner surfaces of the flats serving as a mounting surface for temperature responsive resistances.

The full nature of the invention will be understood from the accompanying drawings and the following description and claims:

Fig. 1 is a top plan view of a sensing element assembly embodying the present invention.

Fig. 2 is a side view of the element shown in Fig. 1.

Fig. 3 is a sectional view taken generally along the line 3—3 of Fig. 2.

Fig. 4 is a schematic illustration of the electrical circuit which may be provided for the temperature responsive resistances.

The sensing element includes a tubular casing generally indicated at 10 and formed so as to be provided with one closed end. The casing is fabricated from two identical sections 11 and 12 which are semicircular in cross section and have inwardly turned flanges 13 along their side margins. The section 11 is formed to provide axially extending, circumferentially spaced flats 14 and 16 thereon and the section 12 has similarly formed flats 17 and 18. Each of the sections is formed of an electrically conductive material having high thermal conductivity, such as copper. The casing sections are held in assembled relation by any suitable means, such as soldering at the inwardly extending flanges 13.

Each of the flats formed in the casing section 12 has mounted thereon in spaced relation a series of temperature responsive resistances indicated at 19. Similarly, the flats formed in the casing section 11 mount a similar series of temperature responsive resistances indicated at 21. As may be seen in Figs. 1 and 2, the resistances are spaced along the flats and are disposed in staggered relation around the casing.

While the temperature responsive resistances may take any conventional form, as described herein they are of generally flat configuration, are of the thermistor type, and have a coating of silver on their opposed major surfaces. The thermistors may be mounted by soldering one of their silvered surfaces to the casing, the opposite surface having soldered thereto an electrical lead wire which may be used to interconnect the resistances in any desired electrical configuration. It will be understood that the opposed silvered surfaces of the thermistor are electrically separated from each other by the resistance of the thermistor element. Soldering one terminal face of the thermistor to the copper casing thus electrically joins one end of the thermistor to the casing, with the lead wire forming the other terminal of the thermistor.

As may be seen in Fig. 4, one form of connection of the thermistors is a series-parallel connection which is provided by the casing and the lead wires 22. In this arrangement one terminal of each thermistor bank is connected in common to the casing. Electrical connection to the series-parallel circuit thereby formed may thus be made through the casing, which acts as one terminal, and the lead wires 22. It will be understood that by providing additional lead wires 22 the thermistors might be connected in other circuit configurations than that shown in Fig. 4.

As may best be seen in Figs. 1 and 2, a sleeve 23, formed of an electrical insulating material, has a reduced end portion 24 which is accommodated within the open end of the casing. A central partition 26 in the sleeve is provided with appropriate apertures which accommodate lead wires 22. The apertures and the lead wires extending therethrough are sealed by means of beads 27, formed of a suitable hardening resin or other similar material. A non-water absorbing cement may be used to seal the reduced end of the sleeve to the adjacent casing surfaces, thereby providing a moisture barrier.

In operation, the sensing element may be suitably mounted by means of sleeve 23 so as to extend into the medium whose temperature fluctuations are to be sensed. Any change in temperature in the medium surrounding the casing will result in thermal conduction through the relatively thin walls of the casing to affect the temperature of the resistances. The consequent change in their electrical resistance thereupon appropriately provides an indication to the control circuit (not shown) connected between the leads 22 and the casing. The staggered spacing of the thermistors along the inner surface of the casing provides a uniform and balanced response of the thermistors to temperature changes. Maintaining the thermistors hermetically sealed within the container preserves them against the deteriorating effect of moisture or other corrosive atmospheres.

From the foregoing it will be apparent that the present invention provides a temperature sensing element in which the casing is characterized by circumferentially spaced flats which provides a convenient mounting surface for temperature sensing resistors such as thermistors. The assembly is characterized by ease of assembly and rapidity of response to temperature changes.

The invention claimed is:

1. A temperature sensing element comprising a tubular casing of electrically conductive high thermal conductivity material, said casing being circular in cross section and having one closed end, four axially extending flats formed in circumferentially spaced relation on said casing, a bank of spaced electrical resistances mounted on the interior surface of each of said flats with one terminal of each of said resistances electrically connected to said casing, lead wires electrically connected to the other terminals of said resistances and extending exteriorly of said casing through its open end, said resistances being positioned in staggered relation along said casing, and means disposed within the open end of said casing accommodating said leads for hermetically sealing the casing interior.

2. A temperature sensing element comprising a tubular casing of high thermal conductivity material, said casing being generally circular in cross section and having one closed end, axially extending flats formed in circumferentially spaced relation on said casing, a bank of spaced electrical resistances mounted on the interior surface of each of said flats, lead wires electrically connected to said resistances and extending exteriorly of said casing through its open end, said resistances being positioned in staggered relation along said casing, and means disposed within the open end of said casing accommodating said leads for hermetically sealing the casing interior.

3. A temperature sensing element comprising a tubular casing of electrically conductive high thermal conductivity material, said casing being generally circular in cross section and having one closed end, an axially extending flat formed on said casing, a bank of spaced electrical resistances mounted on the interior surface of said flat, a lead wire electrically connected to said resistance and extending exteriorly of said casing through its open end, and means disposed within the open end of said casing accommodating said lead for hermetically sealing the casing interior.

4. A temperature sensing element comprising a tubular casing of high thermal conductivity material, said casing being generally circular in cross section and having one closed end, a plurality of axially extending flats formed in circumferentially spaced relation on said casing, a bank of spaced electrical resistances mounted on the interior surface of each of said flats, lead wires electrically connected to the terminals of said resistances and extending exteriorly of said casing through its open end, said resistances being positioned in staggered relation along said casing, and means disposed within the open end of said casing accommodating said leads for hermetically sealing the casing interior.

References Cited in the file of this patent

UNITED STATES PATENTS

| | | |
|---|---|---|
| 2,540,963 | Rutherford et al. | Feb. 6, 1951 |
| 2,606,986 | Sweger | Aug. 12, 1952 |
| 2,796,455 | Jones | June 18, 1957 |